United States Patent [19]
Komori

[11] 3,815,928
[45] June 11, 1974

[54] QUICK-CHANGE TOOLHOLDER FOR NON-REVOLVABLE TOOLS

[75] Inventor: Hideo Komori, Futtsu, Japan

[73] Assignee: Kuroda Seik Co., Ltd., Tokyo, Japan

[22] Filed: Apr. 16, 1973

[21] Appl. No.: 351,789

[30] Foreign Application Priority Data
Apr. 17, 1972 Japan.............................. 47-44328

[52] U.S. Cl.....................279/1 B, 279/9, 82/36 R, 403/343, 403/350
[51] Int. Cl....................... B23b 29/00, B23b 31/10
[58] Field of Search.............. 279/1 R, 1 B, 6, 9, 81, 279/96, 102; 269/287; 82/36 A, 36 R; 408/238, 239; 403/343, 44, 46, 263, 316, 317, 350, 361

[56] References Cited
UNITED STATES PATENTS
1,361,198  12/1920  Strand................................ 279/6 X

*Primary Examiner*—Gil Weidenfeld
*Attorney, Agent, or Firm*—Frank J. Jordan

[57] ABSTRACT

A quick-change toolholder for non-revolvable tools comprise a basic holder and a cutter holder with the basic holder including an annular ring fitted into an annular recess. The annular ring has an inner opening having a center eccentrically displaced relative to the center of its outer periphery. The outer peripheral edge of the annular ring has formed thereon, at least in part, worm threads, and an adjusting shaft is provided with threads meshing with said worm threads. A rotatable means is manually operable at an outer end of the adjusting shaft, wherein said non-revolvable tools are replaceable with alternate tools by revolving the rotatable means simply without need of removing the basic holder from a tool rest at each time of replacement of the non-revolvable tools.

10 Claims, 5 Drawing Figures

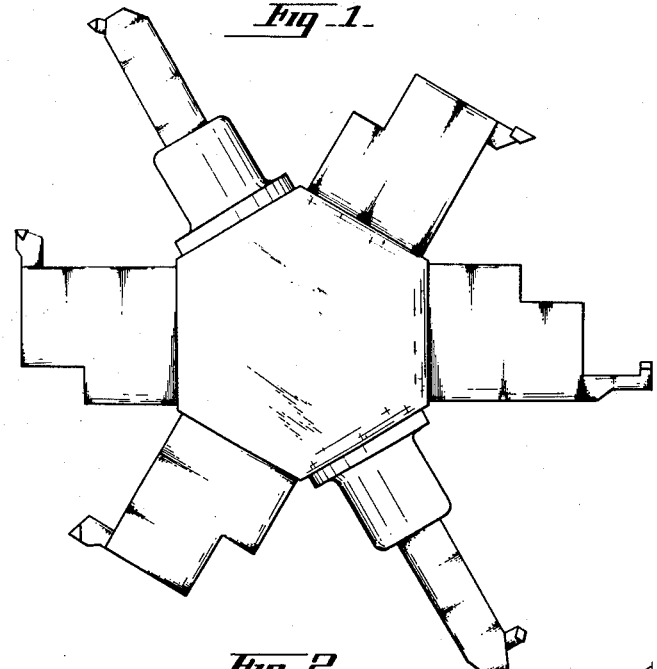
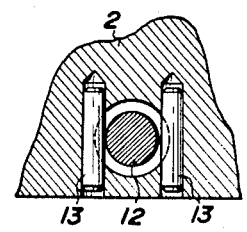
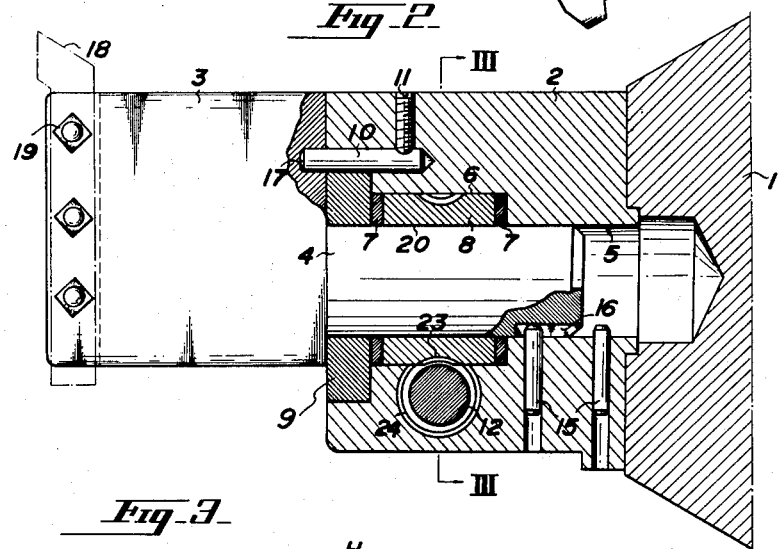
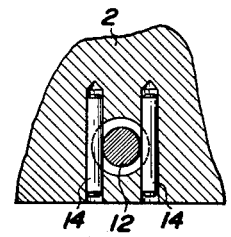
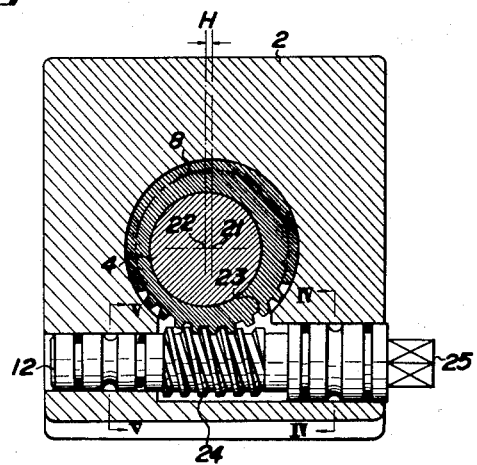

3,815,928

QUICK-CHANGE TOOLHOLDER FOR NON-REVOLVABLE TOOLS

This invention relates to a toolholder and more particularly to a quick-change toolholder for non-revolvable tools as used in a machine tool.

The toolholder in accordance with the present invention is specially adapted for the replacement of tools by alternate tools without the need of having to remove a basic holder from a tool rest but by simply revolving a means at an outer end of an adjusting shaft.

In prior art non-revolvable tools as used in a machine tool, for example, in turret lathes, it is required to select tools particularly adapted for the kind of operation in which a machine tool is used. In practice, generally a toolholder of this kind involves a construction wherein several tools are directly set up in a tool rest, for example, in a turret head of a machine tool by means of a clamping device such as bolt.

Most conventional machine tools such as inner or outer diameter finishing tools, chamfering tools, or cutting-off tools, are further provided in which the tools are previously fixed at a basic toolholder so rigidly that it cannot be desirably removed from a tool rest when a modification of a tooling layout becomes necessary. The type of toolholder for this instance may be designated as a single function toolholder.

The tools according to the present invention may, however, be replaceable by revolving the rotatable means with the basic holder as described as the basic holder is set up rigidly in the tool rest. The kind of toolholder adapted to perform the described function may be designated as a multi-function toolholder. It has hitherto been known that such conventional single function toolholder involves expending much labor and time for effective operation, particularly for the rearrangement of tools on a toolholder when an operator desires to change the tooling layout in time of necessity. Instead of expending such labor and time as above described, the multi-function toolholder of the present invention has entirely overcome this drawback.

A primary object of the invention is therefore to provide a multi-function toolholder which has eliminated such disadvantage and is capable of simple replacement of tools from a toolholder making it particularly useful for practical interchange of machine tools.

With the requirement for the multi-function toolholder fully satisfied, the invention is incorporated in an embodiment, which essentially comprises a basic holder including an annular ring fitted into an annular recess with the annular ring having an inner opening having a center eccentrically displaced an amount H relative to the center of its outer periphery. The outer peripheral edge in part, of the annular ring has formed thereon, at least worm threads, and an adjusting shaft is provided with threads meshing with said worm threads. A rotatable means is manually operable at an outer end of the adjusting shaft.

The amount of eccentric displacement between the center of the inner opening and the center of the outer periphery of the annular ring simply indicated in the above as H may preferably be 1 m/m, such amount however being preferably changed depending on the kind of machine tool operation.

The toolholder of the invention will more fully be illustrated with reference to the accompanying drawings in which:

FIG. 1 is a diagrammatic plan view of a conventional toolholder of the non-revolvable type;

FIG. 2 is a plan view, partly in cross section of one embodiment according to the quick-change toolholder of the present invention showing corresponding parts of the toolholder shown in FIG. 1;

FIG. 3 is a cross section taken along the line III — III of FIG. 2;

FIG. 4 is a cross section taken along the line IV — IV of FIG. 3; and

FIG. 5 is a cross section taken along the line V — V of FIG. 3.

Referring to FIG. 2, the toolholder of the present invention is shown as comprising a basic holder 2 threadedly fitted in a tool rest 1 and a cutter holder 3 mounted on the basic holder 2. The basic holder 2 is provided with a cavity 5 into which a shank 4 of the cutter holder 3 is inserted and fixedly secured. An annular recess 6 is provided in the cutter holder 3 having a diameter somewhat larger than the diameter of the cavity 5. Within the annular recess 6 there is provided a ring 8 which has worm threads 23 on its outer periphery. The ring 8 has an inner cylindrical surface 20 having a center 22 which is eccentrically displaced relative to the center 21 of the outer periphery of the ring 8. The inner cylindrical surface 20 of the ring 8 which is eccentrically displaced from the outer peripheral surface has a somewhat longer longitudinal length than the outer cylindrical surface of the shank 4 of the cutter holder 3. Preferably the outer peripheral surface of the ring 8 may have a clearance somewhat larger than the amount of displacement H between the ring hole 6 of the basic holder 2. A disk plate 9 is threadedly fixed to the basic holder 2 by compression of bearing elements 7 and the ring 8.

The basic holder 2 may be provided with a pin 10, one portion of which projects to a position facing the cutter holder 3. The pin 10 is secured in the basic holder 2 with a screw 11. On the outer holder 3 there is formed a pin hole 17 into which is inserted the pin 10, whereby the contact surfaces of the pin 10 and the basic holder 2 can set off the cutting stress exerted thereon when the cutter holder 3 is fixed into the hole 17. In order to secure the cutter holder 3 to the basic holder 2, an adjustable shaft 12 provided in the basic holder 2 has on its outer periphery worm threads 24 meshing with the threads 23 on the periphery of ring 8. The shaft 12 is provided in a position such that the threads 23, 24 of such members as above described are always in meshing engagement with each other. Numeral 25 designates a manually operating section for rotating the adjusting shaft 12. There are provided, as shown in FIGS. 4 and 5, pins 13 and 14 which are inserted from a side of the basic holder 2 in order to restrict the axial movement of the shaft 12 with respect to the basic holder 12. Similarly, limiting of rotary movement of the cutter holder 3 is achieved by pins 15 which are provided in parallel in recesses in the basic holder 2. Also, on the side or end of the cutter holder 3 opposite the shank 4, a tool 18 is provided which is mounted with screws 19 to form in its entirety a quick-change holder for the tools.

Operation of the quick-change toolholder according to the invention will now be described. When the adjusting shaft 12 is rotated by means of the manually operating part 25, the ring 8 is rotated. As above described, the ring 8 has an inner cylindrical surface 20 having its center 22 eccentrically positioned relative to the center 2 of the outer periphery by an amount H. The adjusting shaft 12 has the worm threads 24 meshing with the threads 23 on the outer periphery of the ring 8 so that the ring 8 rotates when the shaft 12 is rotated. Since the inner cylindrical surface 20 of the ring 8 is eccentrically disposed relative to its outer peripheral surface, the shank 4 may be rigidly secured in the opening 5 of the basic holder 2 and clamped to the inner cylindrical surface of the disk plate 9. It is thereby possible to engage or disengage the shank 4 to and from the basic holder 2 simply and readily by rotation of the adjusting shaft 12 and by associated movement of the worm threads 23.

Preferably, the worm threads 23 formed on the circumference of the outer periphery of the ring 8 may be provided over part or over the entire periphery with similar effect. The amount of eccentric displacement H may be modified as desired as regards its dimensions so as to obtain an appropriate effect and application.

It will be apparent to those skilled in the art that the toolholder of the invention may have various applications and uses for a large number of machine tool operations, for example, turning, boring, reaming, threading, taper turning, and internal and external threading merely by replacement of the cutter holder.

What is claimed is:

1. A quick-change toolholder for non-revolvable tools comprising a base holder having a cavity therein, a cutter holder having a shank disposed in said cavity, means defining an annular recess in said base holder for receiving said shank, eccentric ring means disposed in said recess and having an opening through which said shank passes, and actuating means mounted in said base holder and operable to rotate said eccentric ring means so that the latter engages said shank and wedges it against said base holder to thereby lock and secure said cutter holder on said base holder and to provide for quickly changing a cutter holder on said base holder.

2. A quick-change toolholder according to claim 1 wherein the center of said opening in said eccentric ring is displaced from the center of the outer periphery of said eccentric ring.

3. A quick-change toolholder according to claim 1 wherein said eccentric ring has a variable radial thickness.

4. A quick-change toolholder according to claim 1 wherein at least a part of the outer periphery of said eccentric ring is provided with engaging means, said actuating means comprising an adjusting shaft having thread means engaging said engaging means on said eccentric ring to rotate the latter.

5. A quick-change toolholder according to claim 4 wherein said engaging means includes teeth disposed over at least a portion of the outer periphery of said eccentric ring.

6. A quick-change toolholder according to claim 4 wherein said adjusting shaft has an operating part adapted to be engaged by external means for rotating said adjusting shaft to provide for quickly changing a cutter holder on said base holder.

7. A quick-change toolholder according to claim 4 including means in said base holder operably engaging said adjusting shaft to prevent axial displacement of said adjusting shaft.

8. A quick-change toolholder according to claim 7 wherein the last said means comprises pin elements having longitudinal axes disposed general perpendicular to the longitudinal axis of said adjusting shaft and engaging grooves in said adjusting shaft.

9. A quick-change toolholder according to claim 4 wherein said base holder is mounted on a tool rest, said cutter holder being replaceable with other cutter holders by rotating said adjusting shaft without the requirement for removing the base holder from said tool rest each time said cutter holders are replaced.

10. A quick-change toolholder according to claim 1 wherein the axial length of said eccentric ring is greater than the axial length of said shank.

* * * * *